United States Patent [19]
Hishida

[11] 3,871,629
[45] Mar. 18, 1975

[54] MOULDABLE SYNTHETIC RESIN COLOURING MATERIAL AND APPLICATION APPARATUS THEREOF

[76] Inventor: Iwao Hishida, 4-16, Hattoriminamicho-4-chome, Toyonaka, Japan

[22] Filed: Apr. 24, 1973

[21] Appl. No.: 354,075

[30] Foreign Application Priority Data
July 28, 1972  Japan.............................. 47-75634
Dec. 28, 1972  Japan................................ 48-3597

[52] U.S. Cl...................... 259/191, 99/192, 99/193
[51] Int. Cl................................................ B01f 7/08
[58] Field of Search .......... 259/192, 191, 165, 163, 259/154, 149, 26, 25, 10, 9, 6

[56] References Cited
UNITED STATES PATENTS
3,148,412   9/1964   Spreeuwers......................... 259/191
3,274,647   9/1966   Andouart............................ 259/192

Primary Examiner—Harvey C. Hornsby
Assistant Examiner—Robert T. Pous
Attorney, Agent, or Firm—Hill, Gross, Simpson, Van Santen, Steadman, Chiara & Simpson

[57] ABSTRACT

A mouldable synthetic resin colouring material in the form of sand-like particles each consisting of a fine powder of a colouring agent bonded to the surface of a particle of a synthetic resin powder used as nuclei, and therefore, easy to handle; and an automatic feeder for feeding both synthetic resin and the colouring material to a synthetic resin melting apparatus. The synthetic resin powder used as nuclei is a 10–80 mesh powder of a thermoplastic resin, for example, of polystyrene, polyethylene, polypropylene, polyvinyl chloride, polyester or xylene resin. The automatic feeder for a synthetic resin melting apparatus comprises a first hopper for feeding a resin material to be coloured and a second hopper for feeding a colouring material disposed in or adjacent said first hopper and having a colouring material metering small screw therein, whereby the resin material and colouring material are directly fed into the melting apparatus mixed and melted above a main screw of the melting apparatus.

5 Claims, 3 Drawing Figures 3,871,629

MOULDABLE SYNTHETIC RESIN COLOURING MATERIAL AND APPLICATION APPARATUS THEREOF

BACKGROUND OF THE INVENTION

1. FIELD OF THE INVENTION

This invention relates to a colouring material for mouldable synthetic resins, and more particularly to a colouring material for mouldable synthetic resins which consists of a colouring agent bonded to the surface of a synthetic resin powder used as nuclei. The invention also relates to an automatic feeder for a synthetic resin melting apparatus using such colouring material.

2. DESCRIPTION OF THE PRIOR ART

Use of colouring materials in the moulding of synthetic resins is well known. The colouring materials generally being used are classified into (1) dry colour (in the form of powder), (2) wet colour (humidized and wetted dry colour (1)) and (3) master batch (pellets of a resin having a colouring agent blended therein at a high concentration).

The dry colour (1) is defective in its scattering property and stainability; the wet colour (2) is defective in its stainability although it does not have the scattering property of the dry colour; and the master batch (3) because of being pellets suffers the disadvantages that it introduces an undesirably large amount thereof into the resin to be moulded, that the use of it in the same amount as the dry colour or wet colour results in uneven colouring and that it is costly, although it is completely free of scattering property and stainability. As such, the conventional colouring materials have had the a serious defect in that the handling is inconvenient.

In recent years, aggressive study has been made in every industry to achieve labor-saving and automatization of each operational step, and various efforts have been made also in the resin moulding industry by the individual moulders to the same end. However, because of the difficulty in handling of the dry colour and wet colour only, the colouring step has not enjoyed the results of labor-saving and automatizing efforts as yet. The colouring step in a process of moulding resins is still carried out by mixing a colouring material, such as dry colour or wet colour, with a resin material to be moulded, in a mixer provided adjacent a melting apparatus such as an injection moulding machine or extrusion moulding machine, transferring the mixture into a separate container and then bringing the mixture into a hopper of the melting apparatus. The necessity for the mixing operation of the colouring material and resin material in a moulder's plant not only renders the series of moulding procedures cumbersome but also is undesirable from the safety point of view. Colouring materials in most cases contain heavy metals, such as cadmium, lead and copper, or poisonous compounds such as arsenic and formalin, and therefore the automatization of transportation and metering of the colouring materials has been desired to avoid contamination of the working atmosphere in the plant but this has not been achieved as yet.

The major requirements for achieving the automatic metering and automatic transportion of powdered materials are that the material to be handled has a high specific gravity and that it has low viscosity. The dry colour or wet colour consists of a dyestuff or pigment and a suitable quantity of a dispersing agent, such as lead stearate or a metallic soap or fatty acid salt of barium, calcium, etc., incorporated therein, and has been developed and used as a colouring material for use in moulding. Therefore, they have a small specific gravity and have an especially high viscosity, and the automatic metering, if attempted, of these colours will result in agglomeration or uneven flow of the colours in a metering device. Thus, the automatic metering of the colours has not been achieved as yet. In addition, these colouring materials in most cases are used in an amount of 0.2 – 0.5 % of the resin material and high accuracy is required in the amount used of the colouring materials. Such requirement also makes the automatic metering difficult.

SUMMARY OF THE INVENTION

It is, therefore, an object of the present invention to provide a colouring material which is very easy to handle.

Another object of the invention is to provide a novel powdered colouring material which makes possible the automatic transportation and automatic metering of the material.

A further object of the invention is to provide a powdered colouring material which can be metered with increased accuracy.

An additional object of the invention is to provide a novel automatic feeder for a resin melting apparatus which is capable of feeding a resin material and a colouring agent directly quantitatively without the necessity for mixing them beforehand.

The foregoing objects and other objects as well as the characteristic features of the invention will become more apparent and more readily understandable by the following description and the appended claims when read in conjunction with the accompanying drawings.

DETAILED DESCRIPTION OF THE INVENTION

Figure 1:
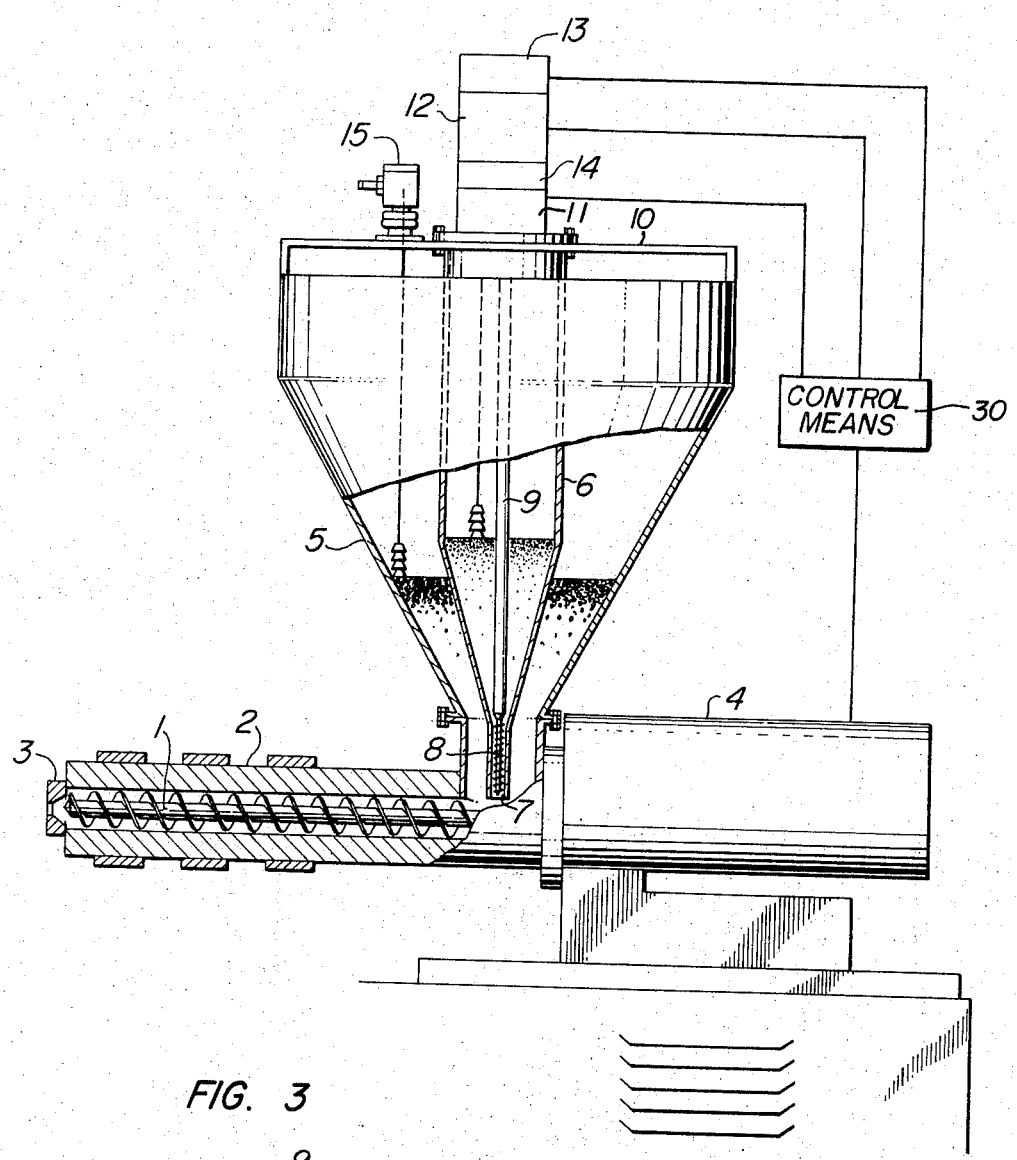
FIG. 1 is a side elevational view, partially in section, of an automatic feeder for a screw type injection moulding apparatus according to an embodiment of the invention.

The present inventor has conducted a lengthy study with a view to obtaining a colouring material capable of automatic metering and, as a result, made a success in producing a colouring material in the form, which look like sand, by using a synthetic resin powder as a nuclei and bonding a colouring agent to the surface thereof. To his surprise, the colouring material thus obtained is flowable like sand used in an hour glass, has an optimum specific gravity and has excellent metering and moving properties, and is very easy to handle. The colouring material makes possible the metering and displacement of it as by a screw and it does not scatter. The use of the synthetic resin powder as a nuclei results in an increase of the volume occupied by the colouring material and, therefore, in an increase of the metering accuracy when the colouring material is metered by its volume.

The synthetic resin powder nuclei usable in the present invention include, for example, powders such as resins of polyethylene, polypropylene, polyvinyl chloride, polystyrene, polyester and polyxylene. These resins may be selectively used relative to the type of resin to be moulded. It is preferred for the size of the nuclei to be larger for obtaining better flowability and better properties, in respect to the quantitative displacement and metering, of the sandy colouring material, but to be conversely smaller for obtaining a larger surface area and a stronger bond of the colouring agent with the nuclei, and a size of 10–80 mesh is usually preferred. For obtaining a strong bond between the synthetic resin nuclei and the colouring agent, the synthetic resin and colouring agent are heated while stirring in a mixer, whereby the surface layers only of the synthetic resin nuclei are softened and become tacky, and the colouring agent adheres to the tacky surfaces of the synthetic resin nuclei, producing a strong bond therebetween. In this case, the bond between the synthetic resin nuclei and the colouring agent is relatively strong and the size of the nuclei may preferably be 10–20 mesh. A suitable adhesive medium may be used for the bonding between the synthetic resin nuclei and colouring agent. For instance, a low boiling point liquid may be added to the synthetic resin nuclei and colouring agent while they are being stirred in the mixer, to assist in bonding of said synthetic resin nuclei and colouring agent. This low boiling point liquid may be removed by evaporating it with heat after the bonding has been achieved. In this case, the bonding strength between the synthetic resin nuclei and colouring agent is somewhat less than that which occurs in the preceding case, and therefore, a size of the nuclei of 60–80 mesh is preferred so as to increase the surface area and surface roughness of the nuclei and thereby to increase the bonding strength of the colouring agent.

The adhesive medium used for assisting in bonding between the synthetic resin nuclei and colouring agent may remain in the product sandy colouring material. As the adhesive medium, an adhesive resin may be used which is compatible with the synthetic resin and has a film-forming property. Such an adhesive resin is used in the form of a fine powder meltable at a low temperature, and when heated and stirred in the mixer together with the synthetic resin nuclei and colouring agent, attaches to the surfaces of the nuclei in the form of a film containing the colouring agent. The adhesive resin may alternatively be used in the form of a solution in a solvent and in this case, the solution of the adhesive resin is added to the synthetic resin nuclei and colouring agent while it is being stirred in the mixer, whereby a film of the adhesive resin is formed on the surface of each nucleus, and thereafter, the solvent is removed by heating the product colouring material. When the adhesive resin is to be used as described above, the synthetic resin nuclei are preferably of a size of 10–20 mesh. Vegetable and mineral liquids may also be used as the adhesive medium. These liquids are used merely to take advantage of the property of a fine powder which is that the fine powder agglomerates with a liquid added thereto, and does not harden per.se. In this case, the bonding strength of the colouring agent is somewhat weak and, therefore, a particle size of the nuclei of 60–80 mesh is preferably. Besides, liquid adhesives, plasticizers, stabilizers, etc., may suitably be used as the adhesive medium. The kind and the manner of application of these adhesive media should be selected properly in accordance with the type of resin used as nuclei, the type of colouring agent used and the type of resin to be moulded.

Hereunder, practical examples of the sandy colouring material according to the present invention will be described:

EXAMPLE 1

10 kgs of white dry colour and 10 kgs of 10–20 mesh styrene resin powder were mixed thoroughly in a mixer, and then 300 c.c. of 20 % solution of styrene (a solution of 20 parts of styrene resin in 100 parts of toluene) was added to the mixture. After thorough mixing, the mixer was heated to a temperature of 60°C. and the mixture was stirred for about 20 minutes, whereby the solvent was removed completely and a sandy colouring material was obtained. The colouring material consisted of styrene resin particles and the dry colour firmly bonded to the surfaces thereof, and was completely free of stainability.

Further, 100 kgs of a mouldable styrene was moulded in a 5-ounce moulding machine, with 600 gs of the colouring material thus obtained incorporated therein. The product of the moulding showed satisfactory dispersion of the colouring agent.

EXAMPLE 2

10 kgs of yellow dry colour and 10 kgs of 10–20 mesh high pressure process polyethylene powder were mixed thoroughly in a mixer, and the mixer was heated to 50°C. Then, 500 c.c. of 25 % solution of cylized rubber (a solution of 25 parts of cylized rubber in 100 parts of toluene) was added to the mixture and the stirring was continued. The solvent was removed completely in about 10 minutes and the resultant colouring material was withdrawn from the mixer upon cooling. The colouring material thus obtained consisted of the polyethylene powder and the colouring agent firmly bonded to the surface thereof, and showed no stainability. A sample moulding of 50 kgs of polyethylene was produced in a moulding machine, with 400 gs of the colouring material thus obtained incorporated therein. The sample moulding showed satisfactory dispersion of the colouring agent.

EXAMPLE 3

10 kgs of 10–20 mesh polypropylene powder and 5 kgs of carbon black as colouring agent were mixed thoroughly in a mixer, and the temperature of the mixer was elevated up to 80°C. Then, 500 gs of a low molecular weight polyethylene fine powder (melting point 60°C.) was added to the mixture, the mixture was stirred. About 5 minutes later, the mixture was cooled and removed from the mixer. The colouring material thus obtained showed the same result as in the preceding Examples.

EXAMPLE 4

10 kgs of titanium white was added to 10 kgs of an polyester resin powder of a size of about 10 mesh, and the mixture was mixed thoroughly in a mixer. The internal temperature of the mixer was elevated to about 80°C. and 500 gs of a low molecular weight polypropylene fine powder was added to the mixture, followed by stirring. About 5 minutes later, the mixture was cooled and removed from the mixer. The colouring material thus obtained showed the same result as in the preceding Examples. The colouring material was used in the moulding of ABS resin, with satisfactory result.

EXAMPLE 5

7 kgs of Phthalocyanine Blue was added to 10 kgs of a xylol resin (rosin modified type, melting point 120°C.) powder of a size of about 10 mesh, and the mixture was mixed thoroughly and heated to a temperature of 80°C. Then, 500 gs of a high pressure process polyethylene fine powder (melting point 60°C.) was added and the mixture was removed from the mixer about 5 minutes later. The colouring material thus obtained showed the same result as in the preceding Examples. As resin was moulded, with 5 % of the colouring material incorporated therein and a transparent blue-coloured moulding was obtained which showed satisfactory dispersion of the colouring agent.

EXAMPLE 6

5 kgs of Lissal Red was added to 10 kgs of polyvinyl chloride powder, and further 1 kg of lead stearate and 1 kg of cadmium stearate were added to the mixture. The resultant mixture was mixed thoroughly in a mixer and the internal temperature of the mixer was elevated to 100°C, followed by mixing for about 5 minutes. After cooling, the mixture was removed from the mixer and a dry sandy colouring material similar to those obtained in the preceding Examples was obtained.

Polyvinyl chloride was moulded in an extrusion moulding machine, with 0.5 part by weight of the colouring material thus obtained per 100 parts by weight of the polyvinyl chloride incorporated therein, and a moulding was obtained which was coloured completely uniformly with no indication of maldispersion of the colouring agent.

EXAMPLE 7

15 kgs of cadmium yellow was added to 10 kgs of a styrol resin powder of a size of about 10 mesh, to which was further added 2 kgs of stearic acid for industrial use. The mixture was thoroughly mixed in a mixer and the mixing was continued after the internal temperature had been elevated to 70°C. 5 minutes later, the mixture was cooled rapidly and removed from the mixer. The colouring material thus obtained showed the same result as in the preceding Examples.

EXAMPLE 8

5 kgs of carbon black dry colour was added to 10 kgs of a high pressure process polyethylene powder of a size of about 70 mesh, and the mixture was mixed thoroughly in a mixer. After adding 1.5 kgs of white spindle oil, the mixture was stirred and then removed from the mixer. The colouring material thus obtained was also in the form of dry sand and sufficiently usable for the intended purpose.

EXAMPLE 9

10 kgs of Phthalocyanine Green dry colour was added to 10 kgs of a styrene resin powder of a size of about 70 mesh, and the mixture was mixed thoroughly in a mixer. The mixture was further stirred with 1 kg of methanol added thereto. After removing the mixture from the mixer, the methanol was completely removed therefrom in a dryer. The colouring material thus obtained showed the same result as in the preceding Examples.

According to the present invention there is also provided an automatic feeder for a synthetic resin melting apparatus, such as a screw type injection moulding apparatus or an extrusion moulding apparatus, so constructed that the colouring material of the invention obtained in the manner described in either one of the Examples given above is metered and supplied directly to the melting apparatus at a point above a main screw of said melting apparatus and mixed with a resin material to be moulded at said point, and the mixture is melted immediately. For feeding the colouring material to the main screw, in a first hopper for feeding the resin material is provided a second hopper for feeding the colouring material, and a small screw is disposed in the lower open end of said second hopper, by which a metered quantity of the colouring material is fed. The feeding rate of the colouring material is adjusted by adjusting the rate of rotation of the small screw. Instead of providing the colouring material feeding second hopper in the resin material feeding hopper, it may be provided independently adjacent said resin material feeding hopper. In the apparatus of the construction described above, the colouring material and resin material are directly mixed with each other in the melting apparatus and, therefore, the extrusion moulding operation can be facilitated.

The features and advantages of the invention will be described in further detail with reference to an embodiment of the invention shown in the accompanying drawings. It should be understood, however, that the embodiment shown in the drawings is merely illustrative and not limitative.

Referring to FIG. 1 there is shown an embodiment of the invention as applied to a screw type injection moulding apparatus. A main screw 1 is disposed rotatably and axially slidably in a cylinder 2 having a heater wound therearound. A die 3 is provided at the forward end of the cylinder 2 and a first hopper 5 is provided at the rear end portion of the cylinder 2 in communication with the main screw 1 for feeding a material to said main screw. At the rear end of the main screw 1 is provided a driving device 4 which is capable of retreating the main screw 1 while rotating it and advancing the same in the unrotating state of the latter. Thus, it will be understood that, when the main screw 1 is rotated by the driving device 4, a resin material is fed to the main screw from the first hopper 5 and displaced by said main screw in the axial direction of the cylinder 2 while being compressed and melted. The main screw 1 is retreated in the axial direction as the molten resin is conveyed toward the forward end of the cylinder 2 and thus the molten resin is accumulated in the forward end portion of said cylinder between the die 3 and the main screw 1. When the main screw 1 has been retreated a predetermined distance and a predetermined quantity of molten resin has been accumulated between the main screw 1 and die 3, the main screw 1 is caused to stop its rotation and advanced axially by the driving device 4 to discharge the predetermined quantity of molten resin in the forward end portion of the cylinder 2 through the die 3. The construction described above is the same as that of a conventional screw type injection moulding apparatus.

According to the invention, a second hopper 6 for feeding the colouring material is provided in the first hopper 5 in communication with the main screw 1. The second hopper 6 has a smooth cylindrical passage 7 formed at its end portion communicating with the axial bore of the cylinder 2, and a colouring material feeding small screw 8 is disposed in said passage 7. The length, outer diameter and pitch of the small screw 8 may be selected properly so as to ensure that the colouring material is fed smoothly at a predetermined rate. A rod 9 is connected to the small screw, which may be independent of or integral with said small screw. The rod 9 is connected at its upper end to a D.C. variable speed motor 12 through a magnetic clutch 11 fixedly mounted on a beam 10 extending across the upper end of the hopper, and is driven by said motor. The D.C. variable speed motor 12 is provided thereon with a speed detector 13. In the drawings, reference numeral 14 designates a level switch for the colouring material and 15 designates a level switch for the resin material. The positions of these level switches are not necessarily restricted to those shown. In the apparatus shown, when the main screw 1 is driven, the resin material is fed to the main screw from the first hopper 5 and concurrently the colouring material is fed from the second hopper 6. Thus, the resin material and colouring material are mixed and melted directly in the cylinder 2, so that the injection moulding operation of coloured molten resins is facilitated remarkably. A high accuracy is required in controlling the feeding rate of the colouring material relative to the resin material to be moulded. The use of the sandy colouring material according to the invention has made possible the quantitative feeding with high accuracy of the colouring material by the small screw 8 provided in the apparatus of FIG. 1. Since the feed of colouring material is metered by the rotating small screw 8, it is necessary to control accurately the rate of said small screw relative to the rate of discharge of the resin material by the main screw 1. To this end, control means (not shown) is provided for the driving device 4, the magnetic clutch 11, the D.C. motor 12 and the speed detector 13. The function of this control means will be described later.

Figure 3:
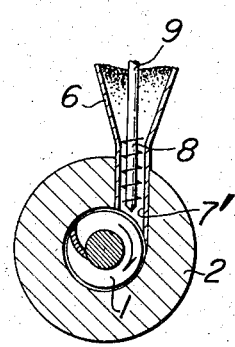
FIG. 3 is a sectional view taken along the line III — III of FIG. 2
Figure 2:
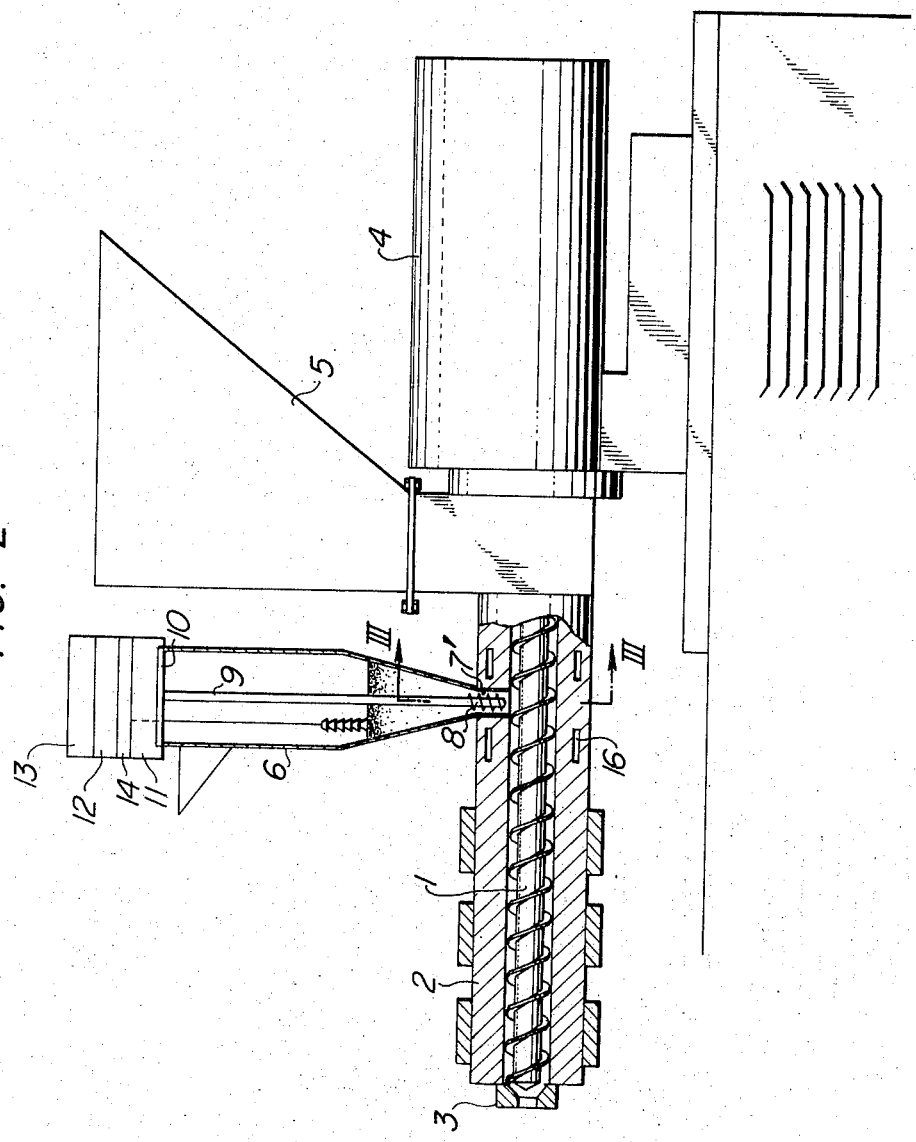
FIG. 2 is a side elevational view, partially in section, of an automatic feeder for a screw type injection moulding apparatus according to another embodiment of the invention.

It is to be understood that the second hopper 6 for colouring material may be provided exteriorly of the first hopper 5 as shown in FIG. 2, instead of providing it within the first hopper as in the apparatus of FIG. 1. In the apparatus of FIG. 2, the second hopper 6 is connected to the cylinder at a point somewhat forwardly of the first hopper 5, to feed the colouring material directly into said cylinder to be mixed with the resin material being conveyed forwardly by the main screw 1. In this embodiment, the lower end of the second hopper 6 communicates with the axial bore of the cylinder 2 by a passage hole 7' which, as shown in FIG. 3, is bored through the wall of said cylinder in the tangential direction of the main screw 1 so that the colouring material may be fed in the same direction as the rotating direction (indicated by the arrow) of the main screw. Such arrangement prevents the resin material being conveyed in the cylinder 2 by the main screw 1 from moving into the passage hole 7' as a countercurrent to the colouring material and interfering with the feeding of said colouring material. The passage hole 7' should be located in such region of the cylinder bore wherein the resin material is not melted, and it is preferable to provide cooling fluid passages 16 in the cylinder 2 adjacent the passage hole 7' to prevent the resin material and colouring material from melting in said region. The constructions at the other portions of this apparatus are the same as those of the apparatus of FIG. 1.

Now, the operation of the apparatus shown in FIGS. 1 and 2 will be described. Each apparatus operates automatically under control of control means (not shown). The D.C. variable speed motor 12 runs at all times and the magnetic clutch 11 is initially deenergized. When the main screw 1 is set in operation, and feeding and melting of the resin material begins under control of the control means, and rotation of said main screw is started and an electrical signal is picked up by suitable detecting means and said signal is fed to a timer setting circuit in the control means. The magnetic clutch 11 is actuated for a time equal to the time set in said timer setting circuit. When the magnetic clutch 11 has thus been actuated, the small screw 8 starts rotating being driven through the rod 9, and feeds the colouring material to the main screw 1. As stated, the start of rotation of the small screw 8 is retarded from the start of rotation of the main screw 1, and this is for the purpose of avoiding premature feeding of the colouring material during the period in which the feeding rate of material resin is not high enough. The speed detector 13 starts operating concurrently when the small screw 8 starts rotating, and generates a pulse corresponding to the rate of rotation of said screw 8. The pulse generated by the speed detector 13 is transmitted to an auto-counter in the control means. When the pulse has reached a predetermined value, set in the auto-counter, the magnetic clutch 11 is deenergized, so that the small screw 8 stops its rotation ceasing the colouring material feeding operation. Suitable braking means may be provided to ensure positive stoppage of the small screw. As described, the small screw 8 starts rotating after the main screw 1 is set in motion, and stops automatically after rotating a preset number of turns and thereby feeding a predetermined quantity of the colouring material. On the other hand, the main screw 1 continues its rotation while retreating, until a predetermined quantity of molten resin is accumulated between it and the die 3, and stops its rotation when the molten resin has reached the predetermined quantity. Thereafter, the main screw 1 moves forward discharging the predetermined quantity of molten resin from the die 3. One cycle of the injection moulding operation is completed by this step, and such cycle of operation is repeated thereafter. In the manner described above, a predetermined quantity of the colouring material is metered and fed to the resin material automatically by the small screw 8 which makes a predetermined number of revolutions during the period from the time when the main screw 1 is set in motion and a predetermined quantity of resin material conveyed thereby starts melting to the time when the predetermined quantity of the molten resin material is discharged through the die. Therefore, the resin material and colouring material are mixed and melted directly in the cylinder at a predetermined ratio. It is preferable to determine previously the rates of rotation of the main screw 1 and small screw 8 such that the main screw 1 will always be rotating throughout the period of rotation of the small screw 8, so as to ensure that the colouring material be fed uniformly into the resin material. More preferably, an arrangement should be made such that the small screw 8 will be rotating during substantially the entire period of rotation of the main screw 1.

The level switches 14, 15 respectively generate a signal when the levels of the colouring material and resin material in the respective hoppers have fallen below a predetermined level, thereby informing the time when said colouring material and resin material are to be replenished either manually or automatically.

Although the present invention has been described and illustrated herein as applied to a screw type injection moulding apparatus, it is to be understood that the invention is applicable also to a screw type extrusion moulding apparatus of the type so designed that the melting and extrusion of resin materials are carried out continuously. The extrusion moulding apparatus to which the present invention is applicable is identical with the apparatus of FIGS. 1 and 2 in respect of mechanical construction, but differs from the latter in respect of operation in that the main screw 1 is not displaced axially but continually driven in its fixed position to carry out the melting and extrusion of resin materials. The control means used with the extrusion moulding apparatus may be simply of the type which keeps the small screw 8 rotating at a rate of speed corresponding to the rate of speed of the main screw 1, because the main screw is driven continually to extrude the resin at a predetermined rate at all times. It is possible, instead of rotating the small screw constantly, to rotate it intermittently, a predetermined number of turns, at each time, at a predetermined time interval.

FIG. 1 illustrates the control means 30 which is connected to the motor 4 for driving the main screw 1 as well as to the motor 12 for driving the small screw 8 and which additionally receives inputs from the speed detector 13 and supplies an output to the magnetic clutch 11 to energize it so as to couple the motor 12 to the small screw 8. Such control means are well within the skill of those of ordinary skill in the art to which this invention pertains.

It will be understood from the description herein that according to the invention the colouring material is fed directly to the main screw to be mixed with the resin material, and therefore, the colouring material mixing operation can be facilitated remarkably.

I claim:

1. An automatic feeder for a resin melting apparatus having main screw means enclosed by a cylinder and heating means surrounding said cylinder for conveying, compressing and melting the resin material fed thereto, comprising first hopper means for feeding a resin material to be melted and second hopper means for feeding a colouring material directly to said main screw means, said second hopper means including a hopper element and a small screw disposed in a colouring material passage formed at the lower end of said hopper element in communication with the cylinder.

2. An automatic feeder for a resin melting apparatus as claimed in claim 1, wherein said second hopper means is provided in said first hopper means, said screw means positively controlling and metering the discharge of coloring material to said cylinder.

3. An automatic feeder for a resin melting apparatus as claimed in claim 1, wherein said second hopper means is provided exteriorly forwardly of said first hopper means with respect to the main screw and said passage is extending tangentially of said main screw.

4. An automatic feeder for a resin melting apparatus as claimed in claim 1, wherein said melting apparatus is a screw type injection moulding apparatus and said feeder further comprises control means for controlling the operation thereof such that the small screw is driven a predetermined number of turns and stopped, after each time the main screw is set in motion.

5. An automatic feeder for a resin melting apparatus as claimed in claim 1, wherein said melting apparatus is a screw type extrusion moulding apparatus and said feeder further comprises control means for controlling the operation thereof such that the small screw is driven at a rate of speed to feed the colouring material at a rate proportional to the rate of extrusion of the resin material by the main screw, throughout the period of rotation of said main screw.

* * * * *